United States Patent [19]

Hancock et al.

[11] 3,754,147
[45] Aug. 21, 1973

[54] METHOD AND SYSTEM FOR CONVERSION OF WATER AND DEVELOPMENT OF POWER

[75] Inventors: Bruce Jay Hancock, Mesa, Ariz.; Don E. Johnson, Irvine, Calif.; Zane W. Merkley, Mesa, Ariz.

[73] Assignee: Aqualectra of Arizona, Mesa, Ariz.

[22] Filed: Oct. 18, 1971

[21] Appl. No.: 190,195

Related U.S. Application Data

[63] Continuation of Ser. No. 803,384, Feb. 28, 1969, abandoned.

[52] U.S. Cl............................. 290/53, 290/1, 290/42
[51] Int. Cl............................................. F03b 13/10
[58] Field of Search ..................... 290/1, 52, 44, 43, 290/42, 53, 54

[56] References Cited
UNITED STATES PATENTS

| | | | |
|---|---|---|---|
| 3,484,617 | 12/1969 | Winsel | 290/1 |
| 3,515,889 | 6/1970 | Kammerer | 290/53 |
| 3,076,096 | 1/1963 | Bachmann | 290/1 |
| 3,064,137 | 11/1962 | Corbett et al. | 290/42 |
| 2,820,148 | 1/1958 | Southwick | 290/53 X |

OTHER PUBLICATIONS

Western Electric Technical Digest No. 22 4–71 pp. 11, 12

Primary Examiner—G. R. Simmons
Attorney—Edwin M. Thomas

[57] ABSTRACT

Using the power from ocean waves, air is entrained by the Bernoulli principle and placed under compression. This compressed air is used to drive prime movers and to generate electricity. The generated electricity can be employed to desalt and separate sea water electrolytically into oxygen and hydrogen and the gases used to produce power and other useful products. The hydrogen which is highly fluid and of low weight can be transported inexpensively to a distance from the sea and then reconverted to water, combining it with atmospheric oxygen, producing substantial energy as well as water.

10 Claims, 6 Drawing Figures

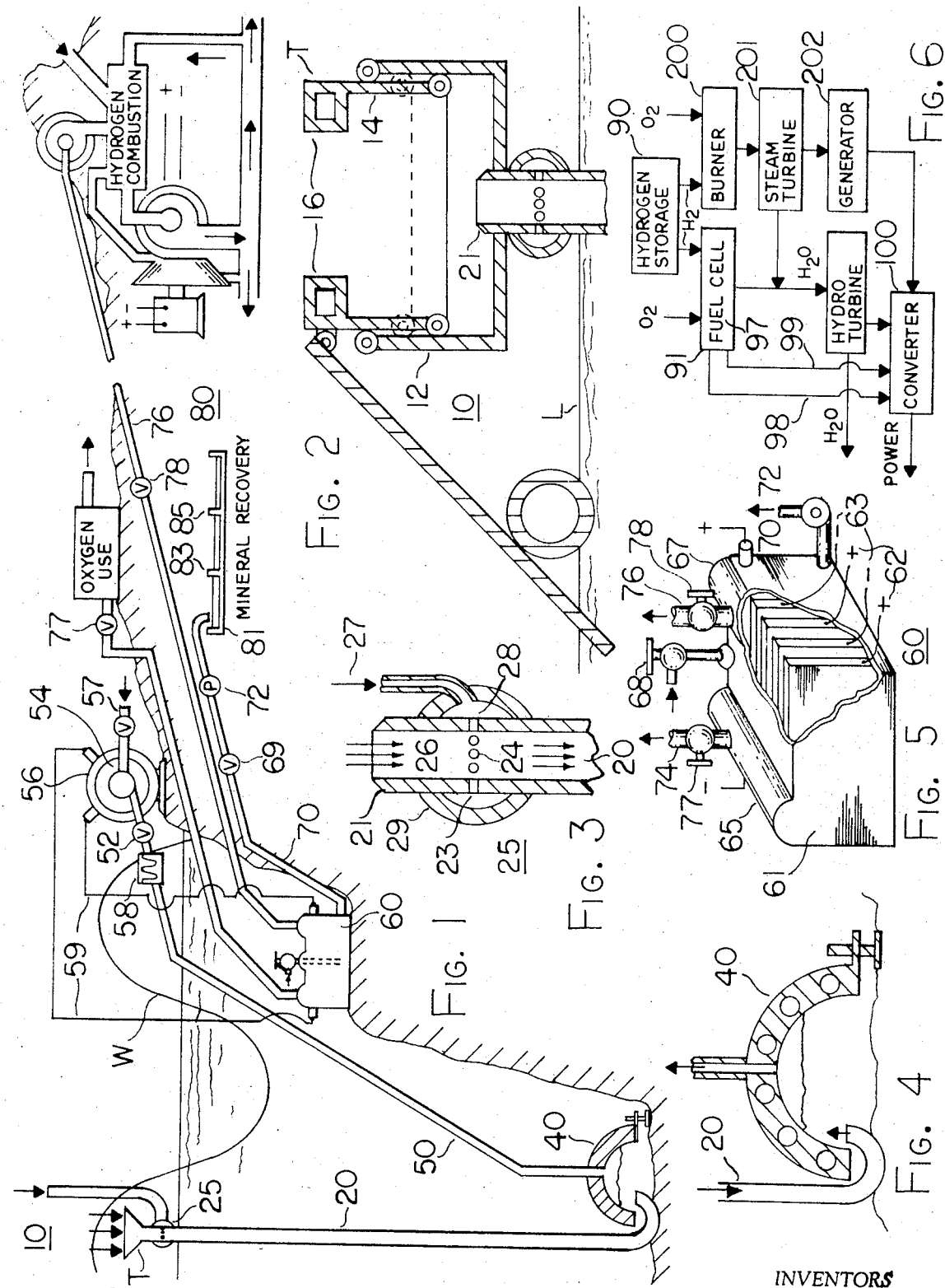

METHOD AND SYSTEM FOR CONVERSION OF WATER AND DEVELOPMENT OF POWER

This application is a continuation of application Ser. no. 803,384 filed Feb. 28, 1969 and now abandoned.

BACKGROUND AND PRIOR ART

The shortage of clean water is becoming a serious world wide problem and many efforts are being made to alleviate this shortage. These include various desalination programs to recover water from the sea by evaporation, other proposals for purification of industrial waste streams, programs for sewage treatment, disposal, etc., and extensive and costly plans for rerouting and distributing the naturally occurring fresh waters on the various continents. Many of these schemes have merit, depending upon the particular location. Some are economically feasible while others are not. Most of them, however, are not suited for bringing fresh water in quantity from the ocean to inland points at considerable distance from the sea.

There are several possible and practicable ways of purifying sea water and transporting it. However, the physical problem of transporting water, even after it is purified, to great distances is a very substantial one. Its cost, when added to desalination costs, seriously impedes the economic distribution of water to inland areas. In desert areas, for example, where rainfall is greatly inadequate for the needs of mankind, the ocean is usually at a considerable distance so that even if water were recovered at reasonable cost from the ocean by evaporation or other schemes, the expense of transporting it for very long distances, say several hundred miles or more and raising it to substantial elevations as is often needed, militates strongly against commercial feasibility. One aspect of the present invention is to reduce very materially this cost of transportation.

It has also been proposed as described in U.S. Pat. No. 3,236,757 to reclaim water from seage, from sea water, etc., by ionic separation. Numerous publications have amplified this proposal and it doubtless has utility in some parts of the world. In such case, however, the water reclaimed is a heavy liquid which must be transported at considerable expense if it is to be used at any substantial distance from the source of the impure water. A particular object of the present invention is to eliminate or minimize this heavy expense of transportation.

An obvious method for purification of water is by electrolysis. The liquid is separated into its constituents, oxygen and hydrogen, by passing an electrical current through it. These constituents obviously may be recombined later. Any salts or other foreign matter are precipitates. This is a highly effective way to obtain water which is free of all foreign matter. Generally speaking, however, the electrolytic process is too expensive for use for extensive systems, especially as usually proposed in the prior art. Enormous quantites of electrical energy are required which can be only partly compensated for by the energy regained when the hydrogen and oxygen are brought back together, e.g. by burning. While in theory the energy so gained should balance that required for electrolysis, mechanical inefficiencies as well as electrical and chemical process inefficiencies, etc., obviously make it impossible to recover all or even most of the power that has been expended.

When a combustible gas such as hydrogen is burned in air or in any oxygen supply to gain energy, the combustion process per se is highly efficient. However, the most efficient mechanical and electrical heat powered generating systems lose a considerable part of the energy. Most turbines, for example, operate at an efficiency of only about 40 percent although some recent designs are alleged to give higher efficiency than this.

Hydrogen gas lends itself extremely well, however, to use in the fuel cell. Recent development of fuel cells has indicated that considerably higher efficiencies may be obtained in the direct generation of electricity by combustion of hydrogen than can be obtained in other ways. It is one aspect of the present invention to employ fuel cells for recovering from hydrogen a very substantial part of the energy required for its electrolytic separation from water.

Various proposals have been made in the prior art to use the abundant wave energy of the sea for producing power. There is vast potential power wasted in the waves of the ocean and many investigators have made ingenious suggestions for recovering some of it. Among such proposals are some that include generation of electricity by trapping water as it is lifted by the wave motion, as for example in U.S. Pat. No. 3,064,137. In this particular patent it is suggested that the energy of ocean waves be used to entrap water and also to enclose and confine under pressure a column of gas, such as air. The column is replenished and repressured from wave to wave of the ocean, and the compressed air is finally expanded through a turbine-operated electrical generator to produce electrical energy which may be stored in a battery. This, of course, is a small scale operation. Numerous suggestions for larger scale power production have been made, using the power of ocean waves to generate electricity. Some of these schemes depend upon the rising and falling motion of the waves, some use a pendulum effect, taking advantage of the torsion caused by tilting heavy bodies due to wave action, and others are proposed to operate by the channeled flow of tides and in other ingenious mechanical ways. Some random examples are found in U.S. Pats. Nos. 3,204,110 and 3,231,749.

The principle of entrapping and compressing air by the movement of water, i.e. using a hydraulic air compressor or "trompe" as it is called, has been employed industrially in the United States for some years. In an installation, air is drawn into a down-flowing stream of water to be trapped into a cavernous underground chamber where the head of water puts it under strong compression. The air is permitted to escape through a pneumatic engine or turbine; thus generating power. This principle is employed as one feature of the present invention.

While the present invention does not avoid all the problems of inefficiency mentioned above, and some are involved in the process steps which will be described more fully below, it does tend to minimize them on the whole. Moreover, by making a reasonably efficient use of the abundant wave energy of the ocean, substantial volumes of air can be put under relatively high compression. The invention embodies means and process for the efficient use of such air, to generate electricity in quantity. This energy is used, in one embodiment, to electrolyze water from the sea or from any other impure source and separate it into hydrogen and oxygen. The oxygen which is thus separated from water constitutes by far the major part of its mass and weight. This oxygen has many uses and one aspect of the present invention is the efficient utilization of the oxygen so obtained. Firstly, it can be recovered under pressure and thus serve as a power source. It can be used for many industrial purposes, as is well known, and it is particularly useful in large quantities in connection with iron and steel production, introducing oxygen rather than air at various stages in the steel decarbonizing process. It is desirable, of course, that the oxygen be generated in a location that is reasonably close to a large iron or steel producing facility. This is not absolutely necessary but it does tend to increase the overall efficiency of the process if a large outlet for the oxygen is available.

While the prior art has known most of the steps of the present invention, the combination of certain steps in various ways involves advantages which are unexpected and substantial. The use of ocean wave energy in a novel manner to produce a continuous flow of energy, the use of that energy to supply a constant production of important products on a large scale, and the overall efficiency and utility of the several steps in combination and sub-combination are highly advantageous.

By use of available compression forces gaseous and other products are produced and transported under pressure without pumping. An advantage of the present invention relates to the economy of transporting hydrogen in large quantities to great distances. Because of its extremely light weight and high fluidity, hydrogen gas can be transported further and at a greater velocity for a given cost than any other substance known. It is estimated, for example, that a 12-inch pipe line 400 miles long and operating at a pressure at the inlet end of 400 pounds or so can supply the hydrogen component of enough water to take care of the needs of a large city. Thus, by transporting hydrogen, which constitutes only one ninth of the total weight of water to a substantial distance and combining it at the terminal with the required oxygen to produce water results in very substantial economies. This is a significant aspect of the present invention. In combination with other spects already mentioned and with still others to be recited in detail hereinafter, the invention provides a highly efficient overall system for conversion of sea water, first to its components, oxygen, hydrogen and other ingredients, and then the transportation of the hydrogen inland to large distances at minimal expense, makes it possible to deliver water in quantity where it is needed at greatly reduced costs compared with other systems now under consideration. It will be understood, however, that there are various and numerous advantages in some of the parts and subcombinations of the invention as well as in its overall aspects.

The United States Office of Saline Waters has underway numerous projects for large scale conversion of sea water to fresh or potable water. While economics vary from place to place, it has been a goal to produce potable water at the lowest possible cost; thus a suggested target has been named as a cost of $.50 or less per 1,000 gallons. Up to the present time, the available systems appear to involve higher costs. Overall cost is important although higher costs can be tolerated under some conditions than under others. The present invention appears to make it possible to supply both power and water in quantity and the water can be delivered to points not hitherto within the range of economic delivery. Generally speaking, the system of this invention can deliver a combination of power and products, including potable water, at a cost below that which is required for many of the water conversion shemes presently under consideration.

BRIEF DESCRIPTION OF DRAWINGS

FIG. 1 is a diagrammatic view showing the basic system or method of the invention for deriving both the main chemical components of water from the sea or other large source of impure water, producing power, recovering minerals, delivering gaseous hydrogen in volume at a great distance, reconverting the hydrogen to water, and generating power by the reconversion.

FIG. 2 is an enlarged vertical sectional view of a water gathering unit.

FIG. 3 is a detailed view, on a large scale, of an entrainment element for air (or other gases).

FIG. 4 is a large scale view of a gas entrapping dome and associated parts.

FIG. 5 is an enlarged detail view, partly in section, of an electrolytic water dissociation unit employed in the system.

FIG. 6 is a diagrammatic view of the water reconversion stage of the process, showing how substantial quantities of power are recovered.

DESCRIPTION OF PREFERRED EMBODIMENT

While the present invention is capable of numerous modifications and variations, the one presently preferred constitutes the following primary apparatus units or process steps:

a A wave powered gas entrainment system of very large capacity, adapted to capture and compress enormous quantities of air (or other gas) to fairly high pressures. The air, which contains a major proportion of nitrogen, can be used in part as a supply source for chemical products as well as a source of power.

b. A pneumatic power generating system adapted to use the compressed air or gas from the first unit or step in the process, to produce direct current electricity in quantity.

c. An electrolytic water dissociation unit or step, adapted to use the generated electricity from (b) for separating water into its components, namely oxygen, hydrogen and a slurry which contains salts and various minerals, etc. The latter, of course, may include ingredients some of which are non-mineral, but for purposes of this invention and for convenience these will usually be referred to as a slurry or sludge consisting mainly of minerals.

d. A means for and step of packaging, delivering and/or using the produced oxygen beneficially.

e. Means for and step of recovering from the discarded slurry minerals and any other associated materials of value.

f. Means for and step of transporting the hydrogen gas produced by water electrolysis to a substantial distance, i.e. to a location near its point of eventual use. It will be understood that some of the hydrogen may be used to produce useful chemicals, e.g. by combination with the nitrogen of the air to produce ammonia, nitric acid, etc.

g. A system and step for combining the delivered gaseous hydrogen with oxygen of the atmosphere and using efficiently the large quantities of energy so released in the production of water. This makes full use of the thermal energy of water formation.

h. Where appropriate, using the potential energy of the water so produced to generate further quantities of useful power. The latter applies, of course, to every step of the process where there is potential energy available.

Referring now to FIG. 1, a large water gathering unit 10 comprises a trough T or other suitable collecting basin situated off shore in the ocean and adapted to gather a vast flow of water from waves W which overflow it periodically. Where wave action is fairly uniform throughout the year, as it is in many sections of the world, the height $h$ of the water basin top surface above the mean level of the sea may be approximately uniform. In many situations, however, the mean height of the waves (indicated by the sinusoidal line W) will vary from day to day and even from hour to hour. Also, the mean height of the sea may vary considerably from time to time, due to tides and other natural causes. For these reasons, it is preferred to make the unit 10 self-adjusting in height so that it will operate continuously at or near whatever level may be required for maximum water flow from waves into the system.

Thus, the unit 10, as shown in FIG. 2, is built to include relatively slidable or telescoping elements comprising a relatively fixed outer member 12 and a self-adjusting inner member 14. Floats 16 are built in to the telescoping inner member 14 to keep its height properly adjusted with respect to the normal level L. For calm sea, the trough T is just high enough to fill as the waves spill into it. When wave action is high, the trough T rises further with respect to member 12 and when wave action diminishes it is self lowering, being controlled by float elements, 16. The trough T, it will be understood, normally will consist of a large assembly of trough units and not merely a single trough. For large scale operations, a simple trough big enough to produce power in quantity would be too unwieldy. Therefore, a series or group of troughs ordinarily will be used. These are all connected through one or preferably several pipe lines 20 with an air entrapping dome 40, to be described in greater detail presently. For clarity, only a single trough unit 10 and a single pipe line 20 are shown in the drawings but these units may be combined in various and obvious ways and employed in substantial numbers, say dozens or more, in a large installation. The necessary guy wires to prevent lateral displacement and to keep the troughs upright to perform their functions are provided but are not shown in the drawings, their use and arrangement being obvious.

The air entrainment means comprises a pipe end 21 projecting with a relatively sharp edge above the bottom of the outer trough member 12. The flow of water into and down this pipe produces a vena contracta 25 of well known type. The flow of water into the end 21 of pipe 20 produces a partial vacuum at about level 23 and inlets 24 for gas (usually air) are provided. In fact, the water stream flowing down pipe 20 occupies only the inner 55 to 65 percent or so of the cross-sectional area of the pipe at this level. Air is supplied to circumferentially spaced inlets 24 through one or more pipes or tubes 27 connected to an annular passage 28 formed about the pipe 20 at the vena contracta level by a jacket element 29. The pipes or tubes 27 project high enough above the normal water level to extend above the highest waves. Downward flow of water through pipe line 20, under pressure of head $h$, FIG. 1, is of sufficient velocity to carry a large quantity of the inducted air with it, despite the buoyant effect of air bubbles. These bubbles, of course, decrease in size as they proceed down the pipe 20 so their buoyant effect is progressively decreasing. It has been found, experimentally, that air bubbles, even large ones, do not rise in water at rapid rates, due to viscosity of the liquid, so a sustained downward velocity in pipe 20 of as little as a foot or two per second is sufficient to carry the gas down stream.

The head $h$ required for an efficient flow downward of water as well as of the entrained air depends on several factors, including the length and inside diameter of the pipe 20 and the resulting frictional resistance to flow, and on the amount of air entrained. The cumulative buoyant effect of all the entrained air tends to resist flow so that control of the amount of air admitted through pipe 27 may not be necessary. A valve, not shown, is provided when such control is needed.

For a length of pipe 20 of about 1,000 feet, desirable for entraining and compressing air efficiently in dome 40 to about 400 psi, the head $h$ should be as great as can be obtained and preferably at least 3 feet. This is a reasonably obtainable head in most seas where the average wave height, above sea level, is often around 4 feet on calm days. On some sea coasts, as on the Pacific Coast of the Northwest United States, the calm sea mean wave height $h$ is considerably greater than this. In such localities, the trough T may be mounted higher than in other areas, resulting in substantially greater water flow and air entrapment.

The pressure applied to the compressed air is proportional to the depth of submergence. For reasons pointed out below, it is desirable to have the air placed under high pressure, where this is feasible. Depending on ocean depth, difficulty of construction, etc., a great depth may or may not be obtainable, from an economic viewpoint. It is preferred, however, to go as deep as is practicable. Also, where air or any of its components, is to be used in a production process, e.g. in making ammonia, it is desirable to have it under pressure. If the dome 40 is submerged to a depth of 2,000 feet, air entrapped therein will be under about 800 psi pressure. Such depth is feasible under some circumstances. In other cases depth may be as little as 100 feet or less but is is preferred to have at least several hundred feet depth.

Assuming that the air thus entrapped is compressed to about 800 psi, a relatively small volume at such a pressure has a high potential energy. Being in deep water, the dome temperature in such case probably will not exceed about 40° F. in most parts of the world. The entrapped air is drawn out of the dome 40 through a pipe line 50, under control of a valve 52. It may be introduced into a pneumatic turbine 54 which drives an electric generator 56. If desired, pipe line 50 may be passed through a heat exchanger 58, e.g. a solar heater or a fuel burning heater, to raise the air temperature and thus give it still greater energy. Combustible fuel may be introduced also to further augment the energy. An inlet 57 is provided for this purpose. The pipe line itself allows some warming of the air under normal ambient temperatures, but heat applied to it from the sun and/or from other sources, or even from combustible fuels, may greatly enhance the increase of energy.

The generator 56 preferably is a low voltage direct current generator for high current capacity, especially for installations where the current is to be used very nearby. Thus, in order to supply the very large direct current which will be required for electrolysis of the impure water, this is a preferred arrangement. The current so generated is led through lines 59 to an electrolytic unit 60 which will next be described.

It will be understood that the generator 56 may be of the alternating type, with suitable transformer and rectifier means for converting to direct current, especially if the current is to be carried any substantial distance, e.g. if the electrolytic unit is placed at a considerable distance from the generator. Resistance losses through conductors 59, etc., would be heavy with direct current if these lines were long.

It is presently preferred to install the electrolytic unit 60 at a substantial depth under water. There are several reasons for this. One reason is to keep the electrolyte water, and particularly the gases derived from it by electrolysis, under substantial pressure. Electrolysis proceeds more efficiently under some applied pressure than at atmospheric pressure. Also, this procedure avoids repressuring of the gases which are released which is always costly. If these (hydrogen, oxygen) gases are to be transported through pipe lines for any substantial distance, they should be under substantial pressure. By setting the electrolytic unit about 1,000 feet below sea level, for example, the gaseous oxygen and hydrogen are produced at a pressure of something over 400 psi. Such pressure is quite suitable for direct bottling of these gases for the commerical market. There is usually a large market for oxygen so packaged. Aside from this, the hydrogen which comprises in volume about two thirds of the total gaseous product, although only a small part by weight, is under sufficient pressure that it will flow to considerable distance, e.g. up to several hundred miles through a moderate sized pipe line without repressuring or booster pumping along the way.

Referring to FIG. 5, the electrolytic unit 60 will now be described in some detail. It comprises a large enclosed vessel 61 capable of operating under pressure, e.g. up to 400 psi, and containing positive plates or anodes 62 and negative plates or cathodes 63. Direct electric current is applied positively to the anodes 62 and results in evolution of oxygen from the anode through dome 65 whereas hydrogen is evolved from the cathodes 63 through dome 67. As the water is thus decomposed into its elements, the salt concentration (and that of other impurities) in the water increases beyond solubility limits. A slurry then begins to form in the bottom of the tank. Obviously, the type and extent of production of oxygen, hydrogen, chlorine (from salt) etc., will depend on the material brought into vessel 61. A valve 68 is shown as being provided for letting in a new supply of water. This valve may be controlled by means not shown from a station above the surface of the sea, or on shore, to keep the electrolytic operation in balance. Also, a valve 69 for controlling outflow of slurry through a pipe line 70 is shown. In balanced operation, it may not be necessary to regulate these valves after the system has been started up.

For starting up, control of the water flow into the electrolytic unit and slurry flow out may require also use of a pump 72 in slurry outlet line 70. Since the slurry is of higher specific gravity than the ambient sea water, it will settle to the bottom of vessel 61. Normally the depth of submersion can be used to cause inflow of sea water through valve 68 and the outflow of slurry through line 70 can be controlled by pressure of the generated oxygen and hydrogen. A slurry pump 72 may be needed if the slurry is to be lifted up to near or above the level of the sea.

For the purposes just described, the outflow lines 74 for oxygen, from dome 65, and outflow of hydrogen from dome 67 through line 76, are shown as being controlled by valves 77 and 78, respectively. These may be automatic, being made responsive to pressure, so that they need no manipulation, except in case of a malfunction, after the system is set in operation. It will be udnerstood also that the gases withdrawn may require treatment or purification before they are further used or processed, depending on the type and quantity of chemicals produced or released in the electrolytic process.

The slurry is passed through its line 70 into a mineral recovery unit 80 which will next be described. Referring to FIG. 1, this unit is shown as comprising a large surfaced evaporating tank 81 having partitions 83, 85 which divide it into cells. Valve means, not shown, may be provided to control flow of the slurry from cell to cell, as will be obvious to those skilled in the art. In arid regions particularly, and to some extent in other areas, solar evaporation is employed to remove most of the water and to produce a salt cake. The latter can be treated thereafter by conventional methods to recover various minerals and/or other substances of value.

Sea water, according to one authority, contains in one cubic mile the following mineral substances, plus small quantities of others not listed:

| | tons |
|---|---:|
| Sodium Chloride | 20,000,000 |
| Magnesium Chloride | 18,000,000 |
| Magnesium Sulphate | 8,000,000 |
| Calcium Sulphate | 7,000,000 |
| Potassium Sulphate | 4,000,000 |
| Calcium carbonate | 550,000 |
| Magnesium bromide | 350,000 |
| Bromine | 300,000 |
| Iodine | 100 to 12,000 |
| Silver | up to 45 |
| Copper, Manganese, Zinc, Lead | 10 to 30 |
| Gold | up to 25 |

The invention is not limited to the treatment of ocean water but such is its largest potential for application.

Depending on the geographical part of the ocean, minerals brought into a water supply by rivers and industrial waste streams may add to the value of the slurry component. The particular means employed to recover specific substances form no part of the present invention but the step of recovery of any one or more of the valuable constituents contained in the slurry is an important economic aspect thereof.

It will be appreclated that for recovery and delivery of potable water the hydrogen which normally constitutes about two thirds by volume of the total product of electrolysis, is a most important product. To some extent it can be an end product. However, potential production of hydrogen is so great, and the demand for it usually is much less than the demand for oxygen that ordinarily the bulk of the hydrogen will be converted to water and/or to chemicals such as ammonia. HYdrogen is a high energy fuel compared to its weight and as already suggested, its energy of combustion should, theoretically, balance the energy consumed in its dissociation from water in the electrolytic unit 60. In practice, only a part of this energy can be regained by combustion but the use of the most efficient combustion devices available reduces the losses.

As suggested above, the low density and low viscosity of hydrogen gas greatly facilitate its transportation for long distances through pipe lines. Other gases, such as natural gas (primarily methane) for example, require compression or booster stations at fairly frequent intervals in long transmission lines. Hydrogen gas flows in large quantities with much less friction; hence, in pipes of reasonable diameter it requires fewer or no recompression or booster pumping stages in lines up to several hundred miles long.

FIG. 1 shows a hydrogen delivery line 76 extending for an indefinite distance. It will be understood that the line 76 may be either above ground or under ground and that it may extend to a substantial distance, at least hundreds and even thousands of miles from the sea. Line 76 is provided with one or more control valves 78 and its terminal delivers the hydrogen gas to a combustion unit. The latter comprises a storage tank 90. A bank 91 of efficient combustion elements designed to reconvert the hydrogen to water, by combustion with oxygen of the air, is shown in FIG. 6 as one means of recovering power.

The specific design of the hydrogen combustion elements forms no part of the present invention. Preferably they comprise a bank of efficient fuel cells 97 adapted to generate electric current directly from the combustion process. See FIG. 6. This electric current is taken from terminals 98, 99 to any suitable means 100 for converting the direct current to alternating current. Combustion of the hydrogen, which is led into the fuel cells preferably at elevated pressure, leaves the system at atmospheric pressure. This combustion, however, can be carried out at elevations considerably above sea level, with relatively little expenditure of energy to bring the hydrogen gas to such elevations. Consequently, the water produced will have substantial potential energy. This can be released by passing the water through a turbine or other machine and generating power in its descent to a city or other inland point of use. This is shown diagrammatically in FIG. 6.

Alternatively, the hydrogen may be burned in a conventional power plant 200 to generate steam which passes through a turbine 201. The latter drives a generator 202 which produces alternating current that can be stepped up or down in voltage for delivery to various consumers at various distances. The steam so generated, preferably comes from water produced by combustion of the hydrogen, making it unnecessary to treat the boiler water. Finally, the product water, and the turbine fluid (steam) are condensed and delivered to a water system; as in the case mentioned above, this system may be elevated well above the area where it is to be used and the water is used, in this situation, to generate further power.

It will be obvious that the system can be varied considerably and that not all the units described or the process steps recited need be used in some situations. Starting with any water having a potential energy supply, a flowing stream is used to carry air down a column and store it under substantial compression. The amount of air which can be so stored depends on the volume of water flowing; e.g. in FIG. 1 its head $h$ above mean sea level, friction losses in pipe 20, the volume of air drawn down with it, etc. Thus a column of water 104 feet high in pipe 20, extending to 100 feet below mean sea level, has a very substantial flow rate in the pipe, with no entrained air. If it contains entrained air, distributed more or less uniformly, its average density is reduced and the net driving head is reduced but still sufficient to cause a strong flow of water with good air entrainment down to the dome 40. This air entrainment aspect is applicable to fresh waters and is not limited to wave sources.

The trapped air bubbles occupy progressively less and less volume in the water as they descend. At 100 feet depth they are approximately one-third their volume at sea level. The total air volume which can be carried downwardly, without bringing the density of a 100-foot deep column in pipe 20 below that required for continuous downward flow, is substantial. In a pipe 20 extending down 1,000 feet, the pressure at the bottom is about 30 atmospheres. For 2,000 feet depth it is about 60 atmospheres, and so on. Air displacement of water and consequent reduction in water column density become less and less as flow goes deeper. Thus a substantial stream of air can be entrained into flowing water and will be brought under high pressure as greater depths are reached, without requiring an excessive driving force to keep the stream moving. Obviously, the degree of aeration of the column in pipe 20 must be kept below that which would bring that column into balance with the static pressure of the surrounding water.

The entrapped air, under pressure in dome 40, is available for many uses. Part of it may be liquefied to separate oxygen and/or nitrogen. The latter may be combined with hydrogen to produce ammonia and the oxygen may be used for industrial purposes or tanked and sold. Ordinarily, however, only a small part of the air will be used for these purposes. Most of it is available for driving a generator 56 as already described.

Capacity of the system for producing potable water and for producing power can be varied by using surplus or waste heat to evaporate saline water, if desired, by using the generated power at 56, or part of it, directly (thereby reducing or eliminating the electrolysis stage), or by various combinations which solar and fuel generated heat exchange. Thus, the system has wide flexibility. It can produce more power in winter when water needs at the outlet are reduced, or more water and less power in summer, etc.

In actual tests of an experimental air entrainment unit it was found that large air bubbles rise through fresh water (in a swimming pool and in a large artifical lake) at about one foot per second, relatively independently of depth of the bubble source. It was found, similarly, that a water flow rate down a pipe exceeding about one foot per second will carry large air bubbles down with it.

A dome for collecting air was secured at the end of a main length of pipe, to which successive lengths of pipe could be joined. The unit was tested in a lake of considerable depth. An airline in the form of a length of copper tubing was attached to the top of the dome, whereas the main pipe was bent around the side of the dome so as to discharge water and air upwardly into the dome when a stream was run through the main pipe. This test unit was lowered into water over 30 feet deep and a bucket with a sharp edged pipe projecting an inch or two above its bottom was used to feed a continuous stream of water down to the dome. The projecting pipe, which was connected to the main pipe, formed a vena contracta and small holes drilled in the sides of this pipe around the vena contracta allowed air to be drawn in. The air thus entrained in the down-flowing stream of water thus was colleced in the dome. By replenishing water in the bucket to maintain a head of only 2 or 3 inches above the end of the projecting pipe, a substantial volume of air was forced into the dome, despite the submergence of the dome 30 feet under water. An air pressure gauge attached to the end of the copper tube, which also projected above the surface of the lake, showed air pressure in the dome to be about 13 psi gauge. The volume of air quickly filled the dome, as it was soon observed that air bubbles were escaping from around its edges. This ceased when the air was allowed to flow out through the copper tube.

Obviously, the economics of the system depend mainly on the scale of operation. It will be apparent to those skilled in the art that various modifications may be made in the process and in the apparatus required to carry it out. Some steps may be omitted or substituted without departing from the spirit and purpose of the invention.

What is claimed is:

1. A system for producing useful power from the periodic wave action of a large body of water undulating between lower and upper levels with respect to a mean water level which comprises, in combination, a water-gathering trough mounted at a relatively fixed level with respect to said mean water level so as to collect inflowing water that rises periodically above the trough level, a first conduit extending downwardly from said trough for conducting water collected in the trough to a level substantially below said mean water level, a Bernoulli constriction in said first conduit and an air inlet surrounding said restriction and connected to an air inlet tube extending above the highest water level of said body of water so that air is aspirated into said first conduit by the downward flow of water therein, said air being carried downwardly by the stream of water in said conduit, an accumulator having an overhead dome and connected to said first conduit so that said air is accumulated above water and under pressure from the surrounding water, an outlet conduit for conducting said pressured air upwardly, and electrical generating means driven by flow of said air from said outlet conduit for generating electrical power.

2. A system according to claim 1 which includes means operable by said flow of air in the outlet conduit for driving a direct current electric generator.

3. A system according to claim 1 in which the electrical power generated is taken to a water decomposition station, and means at said station for producing hydrogen and oxygen from said water.

4. System according to claim 1 which includes means supplied with energy from said pressured air for separating minerals from water which contains them.

5. System according to claim 1 which includes a direct current electric generator driven by said pressured air and located above the mean level of said water.

6. System according to claim 5 which includes a closed electrolytic bath for decomposing a liquid into its elements, and means for maintaining said bath under hydrostatic pressure.

7. System according to claim 6 which comprises an outlet conduit for at least one of said gases for carrying said one gas to a distance under the pressure of said bath.

8. A system according to claim 1 which includes means for producing hydrogen gas by electrolysis and under hydrostatic pressure from the power generated from the pressured air.

9. A system according to claim 8 which includes a fuel cell powered by said hydrogen gas.

10. A system according to claim 1 which includes means powered by the pressured air for freeing combustible gas from a liquid compound including sai combustible gas, and other power means located at a distance and connected to the source of said combustible gas for generating electric power.

* * * * *